Sept. 9, 1952  F. T. PERKES  2,610,279
METHOD OF MAKING POPPET VALVES
Filed March 17, 1949
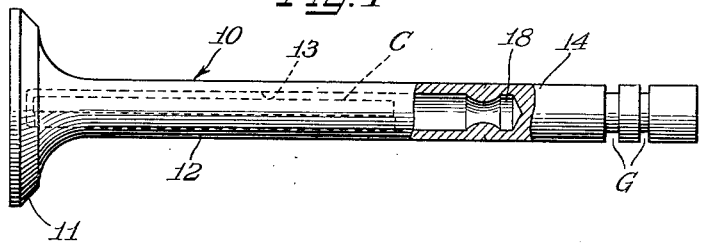
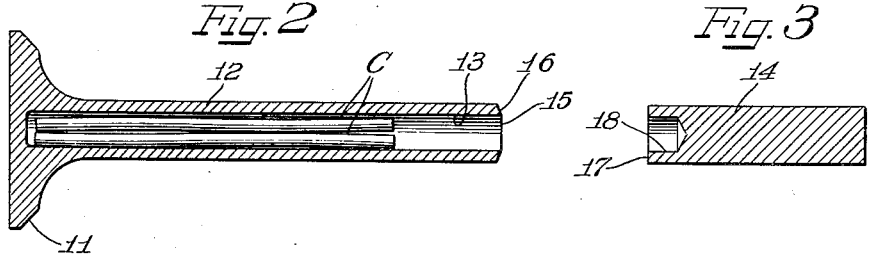
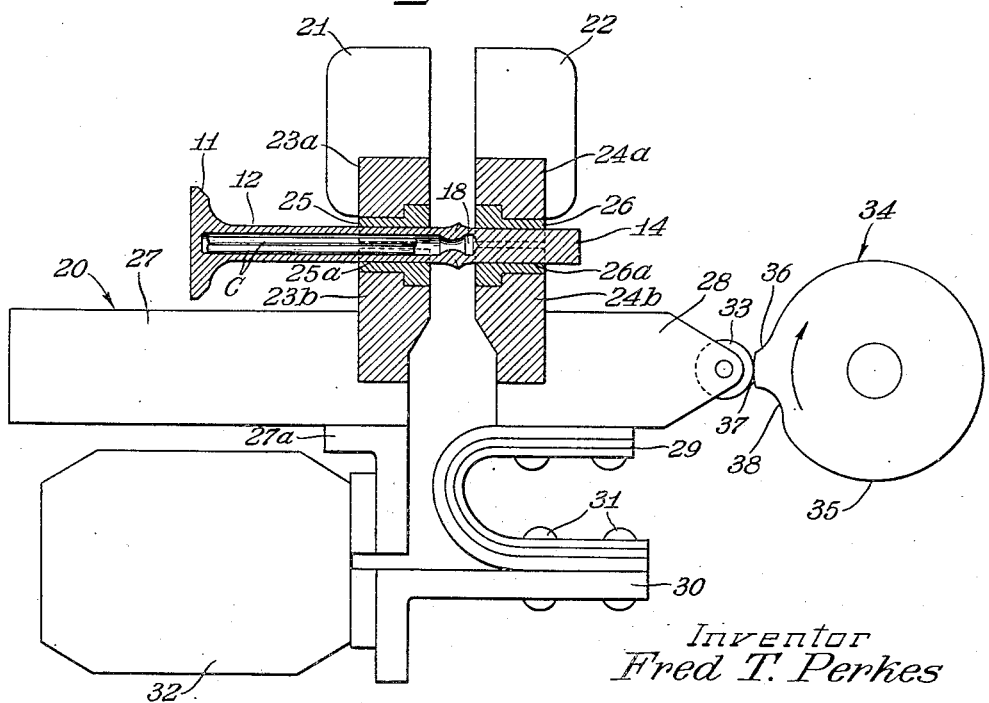
Inventor
Fred T. Perkes
By The Firm of Charles W. Hills Attys Patented Sept. 9, 1952

2,610,279

UNITED STATES PATENT OFFICE 2,610,279

METHOD OF MAKING POPPET VALVES

Fred T. Perkes, Willoughby, Ohio, assignor to Thompson Products Inc., Cleveland, Ohio, a corporation of Ohio Application March 17, 1949, Serial No. 81,987

3 Claims. (Cl. 219—10)

The present invention relates to a method of making a poppet valve and more particularly to an improved method for welding a tip end on the stem of a hollow poppet valve containing a body of coolant.

Coolant-filled poppet valves have heretofore been sealed with welded or stem plugs or head caps or have been composed of separate stem and head portions joined with a sealing weld. However, the head cap welds and the head and stem joining welds are in areas of the poppet valve that must be exposed to combustion gases and are subject to corrosion, high temperatures and wear conditions that do not exist at the tip end of the valve stem. On the other hand while the heretofore used stem plug welds were out of the combustion zone they had to be covered with hard tip ends to resist tappet action thereby necessitating another welding operation. It was not heretofore practical to simultaneously seal and tip the valve stem because welding flash would oxidize or ignite inflammable valve coolants such as sodium and a confined weld area could not be obtained.

The present invention now provides a simple, inexpensive method of simultaneously sealing and tipping a coolant-filled poppet valve which may be carried out entirely by the use of automatic welding machinery. The method not only positions the sealing weld outside of the hot corroding zone of poppet valve operation but confines the weld and flash to a small zone spared from the coolant. Further, the welded on tip, can be of sufficient length to form the valve spring retainer groove area of the stem.

The method of the present invention comprises generally the attachment of a hard valve tip to the open end of a hollow valve stem depending from the valve head. The valve stem and tip are preferably formed of different metals, usually steel alloys, with the tip being formed of a harder material for receiving the valve-actuating mechanism. One of the mating faces of either the valve stem or the stem tip is beveled. Preferably, the exposed valve stem end, which is annular in cross-sectional configuration, is beveled, the bevel angle preferably being from 5 to 10° from a plane normal to the axis of the valve stem. The valve tip is preferably formed of cylindrical stock of substantially the same outside diameter as the valve stem, one end face of the valve tip having a cylindrical recess formed therein of substantially the same diameter as the stem bore.

The beveled valve stem face and the recessed tip face are brought into abutment and an electric heating current is passed through the abutting faces. The heating current is maintained while the abutting faces are held in contact until the softening points of the faces are reached. When the softening points are reached, the abutting faces are jammed into tighter contact to foreshorten the combined length of the tip and the stem with the formation of a permanent welded bond between the abutting faces.

The recess formed in the tip allows equal flowing of the weld flash to assure a consistently strong weld. The beveled face, which may be formed on either the tip face or the corresponding stem face, is effective to create a high resistance area to start the flashing. The bevel angle is such that there is an equal upsetting of the weld area upon the jamming of the faces together to cause a strong weld while the upset length and the flash-off length are controlled by the tube wall thickness. Further, the quickness of the welding operation, when carried out in automatic welding machinery, is such that sodium contained within the head portion of the valve, and thus spaced from the welding zone, does not melt or vaporize during the welding operation.

It is, therefore, an important object of the present invention to provide an improved method of making a coolant-filled poppet valve.

Another important object of the present invention is to provide an improved apparatus for welding a tip end on the stem of a hollow poppet valve containing a body of coolant.

A further important object of the present invention is to provide an improved coolant-filled poppet valve having a tip end welded to the hollow valve stem, the tip end being out of the combustion zone of an engine in which the valve is disposed and the valve tip being of hardened material to resist tappet action.

A still further object of the present invention is to provide an improved method of making a coolant-filled poppet valve by the welding of a tip end to the hollow valve stem by the use of automatic welding machinery.

Other and further objects of the invention will be apparent to those skilled in the art from the following detailed description of the annexed sheet of drawings which, by way of a preferred example only, illustrates one embodiment of the invention.

On the drawings:

Figure 1 is a side elevational view, with parts broken away, of a coolant-filled poppet valve made in accordance with the method of the present invention;

Figure 2 is a view of the valve head and stem prior to the welding operation;

Figure 3 is a cross-sectional view of the valve tip prior to the welding operation; and Figure 4 is a diagrammatic view of apparatus capable of carrying out the method of the present invention and showing the valve and tip end in vertical cross-section.

As shown on the drawings:

In Figure 1, the reference numeral 10 refers generally to a coolant-filled poppet valve made in accordance with the method of the present invention and including a valve head portion 11, a hollow valve stem portion 12 formed integrally with the valve head 11 and having an interior axial bore 13 and a valve tip portion 14 welded to the valve stem. The bore 13 is partially filled with coolant C and valve spring retainer lock grooves G are machined and ground into the tip near its end.

The valve head 11 and the valve stem 12 may be made of any suitable metal, preferably of high melting point steel. I have found that the following alloy may suitably be employed for this portion of the valve:

| Ingredients | Percent by Weight |
|---|---|
| Carbon | .60–.86 |
| Manganese | .20–.60 |
| Silicon | 1.25–2.75 |
| Phosphorus | .03 Maximum |
| Sulphur | .03 Maximum |
| Chromium | 19.–23. |
| Nickel | 1.00–2.00 |
| Iron | Balance |

The valve stem tip 14 is preferably formed of a harder alloy steel having wear characteristics and strength suitable for this use. I have found the following alloy to be particularly desirable for forming the tip 14:

| Ingredients | Percent by Weight |
|---|---|
| Carbon | .38–.43 |
| Manganese | .70–.90 |
| Silicon | .20–.35 |
| Phosphorus | .04 Maximum |
| Sulphur | .04 Maximum |
| Chromium | .55–.25 |
| Nickel | 1.10–1.40 |
| Iron | Balance |

The valve body prior to the welding operation is illustrated in Figure 2 from in which it may be seen that the open end face 15 of valve stem 12 is beveled as at 16, the beveled face being annular in configuration and extending uniformly about the periphery of the end face 15. The angle between beveled face 16 and a radial plane intersecting the end face is preferably from 5° to 10° for reasons to be hereinafter more fully described.

As shown in Figure 3, the stem tip 14 is of substantially the same outside diameter as the stem 12 and is provided with flat end face 17 and a cylindrical recess or well 18 is drilled into this end face. The recess 18 is of substantially the same diameter as the axial bore 13 of stem 12.

If desired the end face 17 may be beveled in place of the beveled end face 11 of the stem. Thus, a beveled face 16 may be provided on either one of the members as desired.

Suitable apparatus for welding the tip 14 to the valve stem 12 is illustrated in Figure 4 of the drawings. The apparatus is indicated generally by reference numeral 20 and includes a pair of upper clamping arms 21 and 22 carrying upper electrode sections 23a and 24a, respectively. Lower mating electrodes 23b and 24b are provided to coact with the upper sections. Each section carries an alloy insert chuck section to provide opposed chucks 25 and 26 which have gripping bores 25a and 26a to hold an inserted rod therein when the clamping arms are closed.

The electrodes 23a and 23b are laterally shiftable, the section 23b being secured to a stationary platen 27 while the electrode section 24b is secured to a movable platen 28 which, in turn, is carried by a generally U-shaped laminated resilient steel spring 29. The movable platen 28 is movable upon distortion of the spring 29, which is secured to a support 30 by suitable means, as by bolts 31. A transformer 32 is secured to support 30 and to a second support 27a secured to stationary platen 27. The transformer 32 is adapted to supply a low voltage, high amperage current to the electrode sections 23a, 23b, 24a and 24b.

The movable platen 28 carries a cam roller 33 rotatably mounted thereon for contact with a flash-off cam 34 having a camming surface 35 extending about a major portion of the periphery thereof, an inclined upsetting camming surface 36 formed as a continuation of flash-off surface 35, and an upsetting plateau 37, for a purpose to be hereinafter described. A steeply inclined cut-off surface 38 completes the periphery of the flash-off cam 32.

The cam 34 is adapted to be rotated by any suitable means to cause a corresponding movement of movable platen 28 and distortion of spring 29 to the position shown in Figure 4.

As shown in Figure 4, the stem 12 and the stem tip 14 are adapted to be axially mounted within the chuck bores inserts 25a and 26a to be tightly gripped therein. The stem 12 and tip 14 are so mounted within the bores 25a and 26a that the surfaces 15 and 17 are placed in abutment by movement of the movable platen 28 caused by rolling contact of the roller 33 with the flash-off surface 35 of the cam 34.

It will readily be understood by those skilled in the art that upon the passage of current through the members 12 and 14 while held in abutment, the surfaces 15 and 17 are heated. The current flowing between electrode sections is so regulated that the surfaces 15 and 17 reach their annealing or softening temperatures during that time interval during which cam roller 33 contacts the flash-off surface 35 of cam 34. Upon contact between roller 33 and the upsetting cam surface 36, the abutting surfaces 15 and 17 will be jammed into contact under a relatively heavy pressure and the upsetting plateau 37 will serve to maintain surfaces 15 and 17 in contact until a firm weld joint has been formed therebetween. As the cam roller 33 moves along cut-off surface 38 of the cam 34, the welding pressure will be released and the members 12 and 14 may be removed from the chucks 25 and 26, either manually by interrupting movement of the flash-off cam or automatically, as desired.

For best results it has been found desirable to have the countersunk portion 18 extend into tip 14 to a depth of at least $\tfrac{1}{16}$ inch to allow for equal flowing of the weld flash to insure a consistently strong weld. Also, the bevel angle imparted to one of the contacting faces 15 or 17 is desirable to create a high resistance area to start the flashing. The limiting of the bevel angle to from 5 to 10° is highly desirable in order that there may be an equal upsetting of the weld area to form a strong weld.

When the valve stem 11 is mounted in the chuck 25 its beveled end 15 is positioned to project beyond the chuck a distance approximately twice the distance that the end face 17 is spaced from the chuck 26. This differential overhang of the mating faces from the chucks is desirable to insure the same temperature at each weld end due to the differences in material employed for these two elements 12 and 14.

It is desirable to correlate the upset length, determined by the rise of cam surface 36, and the flashing time determined by the length of time the cam surface 35 contacts the cam roller 33, with the tube wall thickness. The correlation between these variables is shown in the accompanying Table A, in which T is the tube wall thickness; B is total material lost; D is total flash-off; H is total upset; J is material lost per piece and O. D. is outside diameter of tubing:

*Table A*

| T Inches | B Inches | D Inches | H Inches | J Inches | Flashing Time Seconds | O-D Inches |
|---|---|---|---|---|---|---|
| 0.070 | 0.385 | 0.280 | 0.105 | 0.193 | 3.50 | 1.50 |
| 0.080 | 0.435 | 0.315 | 0.120 | 0.218 | 4.00 | 2.00 |
| 0.090 | 0.475 | 0.345 | 0.130 | 0.238 | 4.50 | 2.50 |
| 0.100 | 0.520 | 0.375 | 0.145 | 0.260 | 5.00 | 3.00 |
| 0.110 | 0.570 | 0.410 | 0.160 | 0.285 | 5.75 | 3.50 |

As a particular example, in employing tubular stock of 0.238 inch outside diameter having a wall thickness of 0.090 inch, the upset on each section of the valve is approximately of the order of 0.062 inch, while the burn-away or fore-shortening of the combined length of the tip and valve stem is of the order of 0.176 inch for each of the valve parts. It will also be understood that the flash length of the cam surface, i. e., cam surface 35, should be correlated with the annealing point or softening point of the alloys employed. For example, alloy composition #1, hereinbefore disclosed, is suitable for use in forming the valve head and stem portion, has a softening point of approximately 1,600° F., while the annealing point of alloy composition #2 is approximately 1,300° F.

In the formation of coolant-filled valves, it is possible to employ the present method with such low melting coolants as sodium, inasmuch as the valve head and stem are normally filled up to from 50 to 60% of total volume with sodium, and since the sodium is in the solid state at room temperature and is located at the head end of the valve away from the welding zone. Thus, the sodium does not have an opportunity to melt or vaporize, due to the quickness of the welding operation hereinbefore described.

It will, of course, be understood that various details of the method and apparatus may be varied through a wide range without departing from the principles of this invention and it is, therefore, not the purpose to limit the patent granted hereon otherwise than necessitated by the scope of the appended claims.

I claim as my invention:

1. The method of simultaneously sealing and tipping a coolant-containing poppet valve having a hollow valve stem open at the tip end which comprises beveling the open end of said stem, inserting coolant in the stem through the beveled open end thereof, spacing the coolant from the open end of the stem, recessing one end of a hard metal tip to provide an annular end face thereon, contacting the beveled end of said stem with the said annular end face of said tip, passing an electric heating current through said contacting end and end face to rapidly bring said end and end face to their respective softening points without substantially heating the coolant in the valve, and jamming said end and said end face together after their respective softening points have been reached to firmly bond said tip to said stem in a welded joint.

2. The method of simultaneously sealing and tipping a coolant-filled poppet valve by welding a hardened closure tip to the top tip end of the valve stem which comprises beveling said open tip end of said stem at an angle ranging from 5° to 10°, substantially filling said stem with a solid inflammable coolant capable of becoming liquid at engine-operating temperatures, drilling an axial aperture of substantially the same size as the bore of the valve stem in a rod of hard valve tip metal, contacting the beveled stem end with the aperture end of said rod, and flash butt-welding said rod to said stem while exerting pressure thereon, the spaced relation of said butt-welding area from said coolant preventing ignition of said coolant.

3. A hollow coolant-filled poppet valve comprising a valve head, a hollow valve stem depending from said head and containing a body of coolant, and a hardened valve stem tip closing the end of said stem, said tip and said stem having mating beveled terminal faces in flash butt-welded together relation, said faces being in spaced relationship to said coolant and the welded zone being sufficiently remote from said valve head to be out of contact with combustion gases flowing around the valve in an engine operating with the valve.

FRED T. PERKES.

REFERENCES CITED

The following references are of record in the file of this patent:

UNITED STATES PATENTS

| Number | Name | Date |
|---|---|---|
| 1,294,416 | Dady | Feb. 18, 1919 |
| 1,468,927 | Spire | Sept. 25, 1923 |
| 1,796,345 | Powell | Mar. 17, 1931 |
| 1,916,012 | Otto et al. | June 27, 1933 |
| 1,916,013 | Otto et al. | June 27, 1933 |
| 1,971,369 | Coryell | Aug. 28, 1934 |
| 2,085,583 | Hanson | June 29, 1937 |
| 2,280,758 | Voorhies | Apr. 21, 1942 |
| 2,293,523 | Warren | Aug. 18, 1942 |
| 2,394,177 | Hoern | Feb. 5, 1946 |
| 2,440,461 | Clements | Apr. 27, 1948 |
| 2,471,937 | Colwell | May 31, 1949 |